United States Patent
Blankenburg et al.

(10) Patent No.: US 10,184,793 B2
(45) Date of Patent: Jan. 22, 2019

(54) MEASURING DEVICE AND METHOD FOR TRIANGULATION MEASUREMENT

(71) Applicant: Pepperl + Fuchs GmbH, Mannheim (DE)

(72) Inventors: Christoph Blankenburg, Mutterstadt (DE); Armin Hornberger, Ludwigshafen (DE); Tim Weis, Bensheim (DE)

(73) Assignee: Pepperl + Fuchs GmbH, Mannheim (DE)

( * ) Notice: Subject to any disclaimer, the term of this patent is extended or adjusted under 35 U.S.C. 154(b) by 0 days.

(21) Appl. No.: 15/791,769

(22) Filed: Oct. 24, 2017

(65) Prior Publication Data

US 2018/0120100 A1 May 3, 2018

(30) Foreign Application Priority Data

Oct. 27, 2016 (EP) .................................. 16195973

(51) Int. Cl.
| | |
|---|---|
| *G01C 3/08* | (2006.01) |
| *G01B 21/04* | (2006.01) |
| *G01B 11/25* | (2006.01) |
| *G06T 7/00* | (2017.01) |

(52) U.S. Cl.
CPC ................ *G01C 3/08* (2013.01); *G01B 11/25* (2013.01); *G01B 21/042* (2013.01); *G06T 7/00* (2013.01)

(58) Field of Classification Search
CPC ....................................................... G01C 3/08
USPC ..... 356/600–640, 237.1–237.6, 239.1–239.8
See application file for complete search history.

(56) References Cited

U.S. PATENT DOCUMENTS

| | | | | |
|---|---|---|---|---|
| 2002/0067474 A1* | 6/2002 | Uomori | ................. | G01S 7/4815 356/3.01 |
| 2007/0285672 A1* | 12/2007 | Mukai | ................ | G01B 11/2518 356/603 |
| 2012/0262550 A1* | 10/2012 | Bridges | ................ | G01C 15/002 348/46 |

FOREIGN PATENT DOCUMENTS

| | | |
|---|---|---|
| DE | 102007038810 A1 | 2/2009 |
| EP | 2111947 A2 | 10/2009 |
| JP | 4924042 B2 | 4/2012 |

OTHER PUBLICATIONS

Application No. EP 16195973, Search Report, dated May 8, 2017, 2 pages.

* cited by examiner

*Primary Examiner* — Tri T Ton
(74) *Attorney, Agent, or Firm* — LaBatt, LLC

(57) ABSTRACT

A measuring device for triangulation measurement comprises a light transmitter for emitting illuminating light; a transmitting optical system for directing the illuminating light in a light pattern in the direction of an object; a light receiver for recording an image; a control and evaluation unit, which determines, in a measurement mode, form or position information of the object based on a measurement image of the light receiver. According to the invention the control and evaluation unit can change over between the measurement mode and a data reading mode, wherein the control and evaluation unit, in the data reading mode, evaluates the image with respect to encoded parameter data, and, in a subsequent measurement mode, uses the parameter data read in this way. In addition, a corresponding method for triangulation measurement is described.

14 Claims, 3 Drawing Sheets

MEASURING DEVICE AND METHOD FOR TRIANGULATION MEASUREMENT

REFERENCE TO RELATED APPLICATIONS

The current application claims priority to European Patent Application No. 16 195 973.9, filed on 27 Oct. 2016, which is hereby incorporated by reference.

TECHNICAL FIELD

The present invention relates in a first aspect to a measuring device for triangulation measurement according to the preamble of claim 1.

In a second aspect the invention relates to a method for triangulation measurement according to the preamble of claim 12.

BACKGROUND ART

In a triangulation measurement, light is emitted with a light transmitter onto an object to be examined. Light is thrown back from the illuminated object area and detected with a light receiver. The light receiver can have a spatial resolution and record a measurement image. According to the triangulation principle the light transmitter and light receiver are offset relative to each other in a direction transverse to the measuring direction or arranged at an angle to each other, so that, in the measurement image, the position of the illuminated object area depends on the distance of the object from the measuring device. Position or distance information relating to the object can thus be obtained.

An established measurement method uses a linear illumination. Here, illuminating light is emitted in a light pattern, in particular in the form of a line/a light strip, typically in the form of a straight line. Depending on the shape, or form, of the object, however, a straight line is not recorded in the measurement image, but instead a distorted line or a stepped progression. From the progression recorded in the measurement image it is therefore possible to derive shape or position information for the object. For greater reliability, a plurality of line-shaped illuminations or light strips can be used.

A generic measuring device for triangulation measurement comprises a light transmitter for emitting illuminating light in a measurement mode, a transmitting optical system for guiding the illuminating light in a light pattern, in particularly in a plurality of light strips, in the direction of an object; a light receiver for recording an image, wherein, in the measurement mode, the image is a measurement image of the object, which is recorded by measuring of light thrown back from the illuminated object areas; and a control and evaluation unit, which is designed to determine shape or position information of the object, in a measurement mode, based on the measurement image.

Correspondingly, it is provided in a generic method for triangulation measurement that:
  with a light transmitter, illuminating light is emitted,
  with a transmitting optical system, the illuminating light is guided in a light pattern, in particular in a plurality of light strips, in the direction of an object,
  with a light receiver, light thrown back from illuminated object areas is measured and a measurement image of the object is recorded, and
  with a control and evaluation unit, shape, or form, or position information of the object is determined based on the measurement image.

Such a measuring device and such a measurement method are described by the applicant for example in EP 2 287 560 B1 and are also known from U.S. Pat. No. 6,542,249 B1 and US 2004/0032974 A1.

Various parameter data are used for the measurement mode. These can be for example the exposure time or target values for the objects to be measured, for example a desired object vertical profile. Ideal parameter data for the measurement mode therefore depend, in particular, on a field of use and the objects to be examined at the given moment. It can therefore be useful to transmit parameter data via a communication interface to the measuring device.

A BUS interface, for example CAN, Profibus, Ethernet or a serial interface, is frequently used as a communication interface. The resources for transmitting new parameter data is, however, undesirably high here, as corresponding computing units, computers with associated programs and relatively well-trained staff are required to operate the programs. The term "computing unit" is to be understood here to mean computers, but also memory-programmable controllers and process management systems, and other computer-based control and regulating units.

Furthermore, a radio module, which receives the parameter data for example from a smartphone or a computer, can also be used as a communication interface. However, there are numerous risks and problems here: viruses or other harmful software on the smartphone or computer could transmit undesired parameter data to the measuring device. Third parties could also access the measuring device by other radio means. In environments with electromagnetic interference sources or shielding environments, radio modules are frequently unreliable. Radio modules may also be banned in principle, in order to exclude interference to a company network.

Alternatively, parameter data can be input into the measuring device via an operating element, for example via a button, a touch-sensitive screen or a turning element. Due to the small size of the measuring device, however, a touch-sensitive screen is very small in most cases and the menu management is also frequently inconvenient. Buttons on the measuring device are also very small in most cases and, depending on the field of use, are often very difficult to reach. Generally, only trained staff can carry out data input via operating elements.

SUMMARY OF THE INVENTION

It can be regarded as an object of the invention to indicate a measuring device and a method for triangulation measurement with a measuring device, wherein parameter data can be simply and reliably transmitted to the measuring device.

This object is achieved through the measuring device having the features of claim 1 and through the method having the features of claim 12.

Advantageous variants of the measuring device according to the invention and the method according to the invention are the subject matter of the dependent claims and are additionally explained in the description below.

With the measuring device of the abovementioned type, according to the invention the control and evaluation unit is designed to switch between the measurement mode and a data reading mode, wherein the control and evaluation unit is designed to evaluate, in the data reading mode, the image with respect to encoded parameter data and to use the parameter data read in this way in a subsequent measurement mode.

Similarly, in the method of the abovementioned type according to the invention a data reading mode is carried out, in which the light receiver measures light from an object provided with a code and records an image, hereinafter described as a "code image" (i.e. an encoded image), and the control and evaluation unit evaluates the code image with respect to encoded parameter data. In a measurement mode, which follows the data reading mode, the parameter data read in the data reading mode are used. The abovementioned measurement mode of the method according to the invention can be this measurement mode following the data reading mode.

The term "light pattern" is to be understood within the scope of the present description to be an, in principle, arbitrary structuring of the transmitted light. This structuring can involve the light being radiated in simple geometric structures, such as strips, i.e. light bands, or dots, to the objects to be measured. In principle, the term "light pattern" is to be understood, however, to also mean a time-based structuring. For example light can be radiated by different light transmitters to one and the same object. If different light transmitters or light sources are used that are located at different positions in the space, the light can also be comparatively unstructured as seen in spatial terms. In particular, unstructured, thus planar or continuous light, can also then be used. For example, continuous light can radiated onto an object in an alternating manner from different spatial directions.

According to an essential idea of the invention, a recording of parameter data is realised optically, namely by the light receiver recording an image, which is then evaluated. The light receiver has, for this, a spatial resolution and can for example include a camera. The data to be read are applied, or attached in some way, to an object, for example as a barcode. Due to this optical reading, input via operating elements on the measuring device is not necessary. Furthermore, there is no need for a radio module and there are no risks whatsoever with respect to electromagnetic compatibility (EMC). In addition, attempted tampering, or manipulation, can be extensively excluded through malware in that information-carrying objects, which contain the parameter data, can only be read via the described optical path.

The measuring device can operated in two different operating modes. In the data reading mode, a recorded image is evaluated to establish whether a code can be detected in the image. The parameter data are then read from this code. The image recorded in the data reading mode is also referred to as a "code image". The object imaged in the data reading mode carries the code and can therefore also be described as an information-carrying object.

In the measurement mode, a recorded image of an object to be examined is recorded and evaluated with respect to the position and form, for example, of light strips, which have been radiated onto the object to be examined. The object to be examined that is used in the measurement mode is different, in most applications, from the information-carrying object used in the data reading mode.

For illumination, in principle the same light transmitter can be used in the measurement mode and in the data reading mode. In particular it can be provided to use only the light transmitter for illumination in these two operating modes. As the light transmitter generates for example a strip pattern, it is meaningful in these cases if the information-carrying object includes a code that can be illuminated by a single light strip. Such a code can be, for example, a one-dimensional barcode.

However, there may also be an additional illumination means. The control and evaluation unit can be designed to switch on the additional illumination means in the data reading mode. The additional illumination means can be designed to illuminate a larger area than the light transmitter. This can be achieved for example by different optical systems, wherein a light source from the transmitter and a light source from the additional illumination means do not necessarily have to be different. Both can be formed for example by a respective laser or also by the same laser. The additional illumination means can provide a, for example planar, illumination, i.e. without gaps. The light transmitter on the other hand does not generate, together with the transmitting optical system, a planar illumination, but instead for example one or a plurality of light strips, between which there are unilluminated areas. The additional illumination means can be meaningful in particular if the code on the information-carrying object is a two-dimensional code, which has not been completely illuminated by a light strip or a light source.

It can be preferred for the additional illumination means to emit light in the same or in an overlapping wavelength range as the light transmitter. This is advantageous with respect to the design of the light receiver and/or other components of the measuring device.

The control and evaluation unit can be designed to switch off the additional illumination means in the measurement mode. It can also be provided that the light transmitter is switched on solely in the measurement mode and not in the data reading mode.

In further embodiments, in turn, extraneous light or ambient light is used in the data reading mode. Accordingly, the light transmitter is switched off here and there is no additional illumination means or, at any rate, is not switched on in the data reading mode. In light environments this embodiment is advantageous and difficulties cannot therefore arise in that, for example, the light strips emitted by the light transmitter can only illuminate a small part of an information-carrying object.

In particular if solely ambient light is used in the data reading mode, an exposure time of the light receiver is relevant. In a data reading mode, a longer exposure time of the light receiver can be set than in the measurement mode. However, also when using the light transmitter or the additional illumination means, a greater exposure time in the data reading mode can be useful. In this way, dark and light areas of a code on the object can be particularly reliably recorded. On the other hand, more rapid object movements are frequent in the measurement mode, meaning that, here, a shorter exposure time is preferable.

The parameter data can be in principle any data that are used in a measurement mode following the data reading mode. These can be data for controlling the light transmitter, the light receiver or for evaluating a recorded image. For example the parameter data can include an exposure duration value. The control and evaluation unit can be designed, in the measurement mode following the data reading mode, to use the exposure duration value to control the light transmitter and/or the light receiver. In the case of the light transmitter the exposure duration value can be understood to be a light pulse duration. In the case of the light receiver an exposure duration can indicate the timespan until light-sensitive elements of the light receiver are read.

The parameter data can also include object target information, for example an ideal vertical profile of an object, or other information on the ideal dimensions of an object. Parameter data can also be limit values for a vertical profile or for other dimensions, wherein it is decided, dependent on compliance with the limit values, whether or not an object to be measured meets predefined criteria. The control and evaluation unit can be designed to process form and position information of the object detected on the basis of the measured image in a measurement mode, following the data reading mode, with the object target information and to output a result thereof via an electrical connection of the measuring device.

The data reading mode can be started in principle in different ways. The control and evaluation unit can be designed to carry out the data reading mode in the case of one, in particular in the case of each, switch-on of the measuring device. There is subsequently a changeover to the measurement mode. The end of the data reading mode can be achieved by encoded parameter data having been detected in a recorded image and evaluated.

Alternatively or additionally, a data reading mode can also be started after a predefined timespan and/or through actuation of an operating element on the measuring device. The use of an operating element has, as previously, significant advantages with respect to conventional measuring devices, wherein all the parameter data are input to the measuring device via operating elements. The operation is thereby easier and less prone to error if staff members with limited training merely need to actuate an operating element to start the data reading mode.

The following embodiment can be useful in particular if an illumination is realised in the data reading mode as in the measurement mode via the light transmitter, or if, in both cases, the additional illumination means is used. The control and evaluation unit can be designed:
to evaluate the image recorded by the light receiver to establish whether a code and thus encoded parameters are contained in the image,
to carry out the data reading mode if a code is contained in the image, and
to carry out the measurement mode if no code is contained in the image.

The code can for example be a multidimensional, in particular two-dimensional, code, which includes a detection area, through which it is detected that a code is present, and which includes a data area, in which the parameter data are encoded.

In the above embodiment therefore, it is only decided through the evaluation of the recorded image whether a data reading mode or a measurement mode is to be realised. The light transmitter and the light receiver are hereby operated in both cases in the same way.

The invention also comprises a combination of a measuring device, which is designed as described here, and an object that contains/carries the encoded parameter data. This information-carrying object can have a code or code area, in which parameter data are encoded through light and dark areas, in particular through a one-dimensional barcode or a two-dimensional code.

Alternatively or additionally, however, the triangulation principle can also be used to detect a code. The light transmitter and the additional illumination means, which are also possibly present, are arranged according to the triangulation principle relative to the light receiver, whereby a vertical profile of the information-carrying object can be measured. The parameter data can now be encoded in the vertical profile of the object, i.e. different parameter data correspond to different progressions of a vertical profile. Coding by areas with different lightness (as in the case of a barcode) is not therefore required. Depending on the field of application, the coding via a vertical profile can be more reliable. The vertical profile can be formed for example by a stamped form in the object.

The abovementioned transmitting optical system for generating for example the light strips can in principle be designed as desired. For example, the transmitting optical system can comprise a structured element, which "imprints" a spatial structure, in particular as described above, on the incident illuminating light. The structured element can be a diffractive optical element, which has a structure for generating a light pattern, for example of the different light strips. A diffractive optical element can comprise a transparent carrier, for example a glass carrier, on which a microstructure is applied, for example grooves or other depressions. Impinging light is diffracted on the microstructure, wherein partial beams of the impinging light interfere with each other. The light strips, for example, can hereby be formed.

In alternative embodiments, the transmitting optical system can also have a multi-mirror array, of which the mirrors are orientated so that impinging illuminating light is directed further as a light pattern, for example as different light strips. In a further alternative embodiment the transmitting optical system has an array of microlenses, which are arranged and formed so that impinging light is transmitted as a light pattern, for example in different light strips. For this, the lenses can be differently formed, in particular being partially darkened in order to bring about different degrees of transmission.

Method variants also follow from the proper use of the described embodiments of measuring devices according to the invention. Method variants are also to be interpreted as variants of the measuring device.

BRIEF DESCRIPTION OF THE DRAWINGS

Further advantages and features of the invention are described below with reference to the attached schematic drawings, in which.

The same components and those acting in the same way are generally identified in the figures with the same reference symbols.

DETAILED DESCRIPTION OF THE INVENTION

Figure 1:
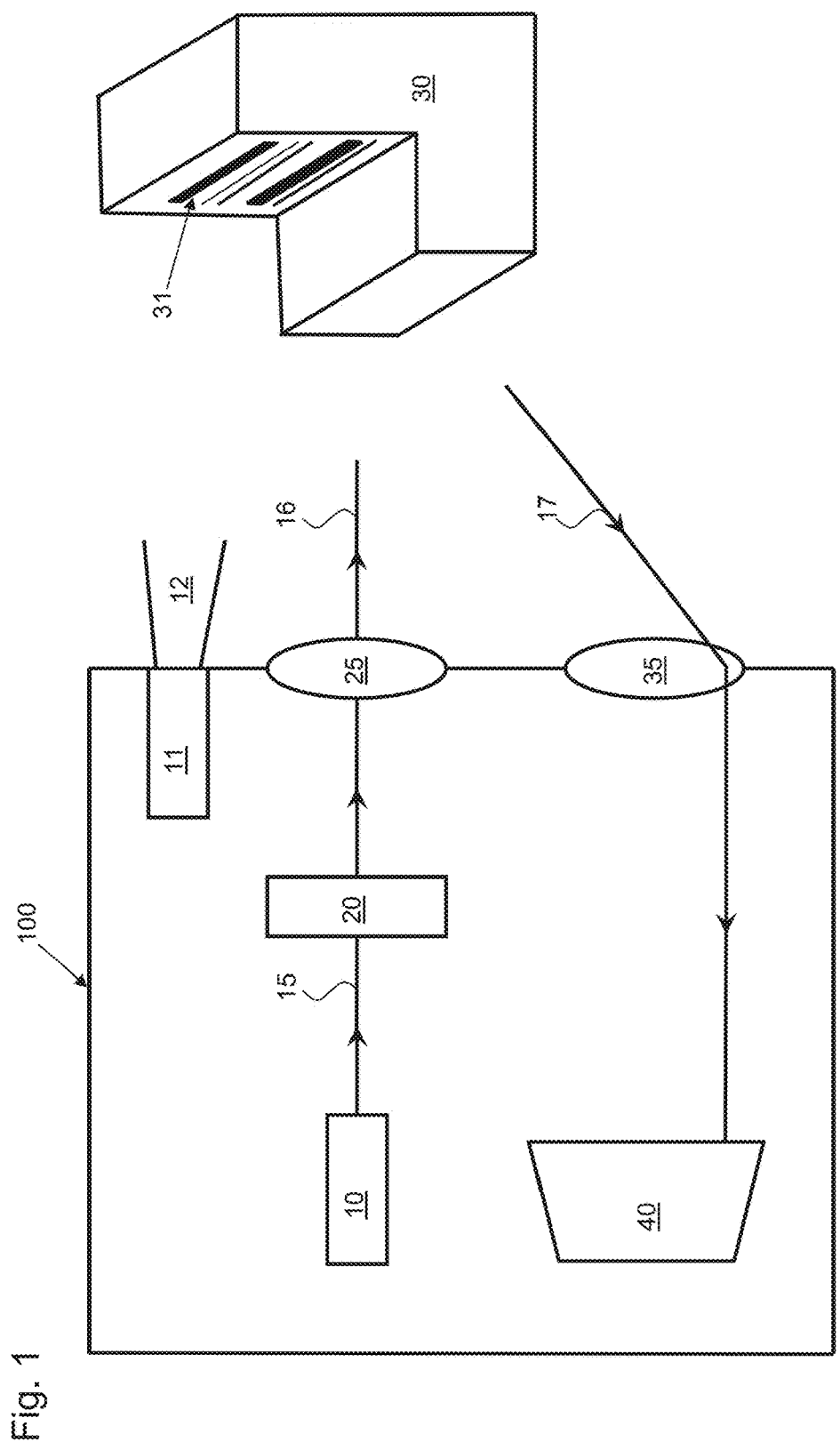
FIG. 1 shows a schematic representation of an embodiment of a measuring device according to the invention.

FIG. 1 shows an exemplary embodiment of a measuring device 100 according to the invention. This comprises a light transmitter 10 and a light receiver 40, which are arranged and designed for a triangulation measurement. The light transmitter emits illuminating light 15. With a transmitting optical system 20, 25, the illuminating light 15 is guided, in the example shown, in the form of one or a plurality of strips, which are also described as "light strips" 16, further in the direction of an object 30. The illuminating light hereby has in cross-section, i.e. in a section transverse or perpendicular to the propagation direction, a strip or preferably a plurality of strips spaced apart from each other. The strips can be parallel to each other. It is emphasised that the light pattern can, in principle, also have a different design. For example a plurality of points, or dots, or light objects formed in any other way can be present. In principle, it is also possible for the light pattern to have a time-based structuring in the sense that at different times different light patterns can be radiated onto an object, which can then also be comparatively unstructured.

When the light strips impinge on the object 30, light 17 is thrown back from the illuminated object areas. The thrown-back light 17 is detected with the light receiver 40. The light receiver 40 can be a camera that records a two-dimensional image. The thrown-back light 17 leads, in the image, to strips corresponding to the light strips.

The object 30 can be an object 30 to be examined, of which the position and/or form are to be measured. In order to examine such an object 30, a measurement mode is carried out. In this measurement mode, the light transmitter 10 and the light receiver 40 are operated as described above. The image hereby recorded is also described as the "measurement image". The control and evaluation unit of the measuring device 100 now evaluates the measurement image. For this, the form and progression, or pattern, of strips recorded in the image are evaluated. The strips are based on the light strips that impinge on the object 30. The form and distance of the object 30 influence the form and pattern, or progression, of the strips in the image. The control and evaluation unit can thus draw conclusions therefrom on the form and/or the distance of the object 30.

For the measurement mode, different parameter data are required. These can include for example: a pulse duration for which the light transmitter 10 emits illuminating light 15; an exposure duration, over which the light receiver 40 integrates impinging light 17; data/comparison data on objects to be examined, with which the control and evaluation unit can decide whether an object being examined at the specific moment in time meets predefined criteria relating to form or distance.

Such parameter data are not transmitted, or at any rate not exclusively transmitted, according to the invention via a cable or electromagnetic radio. Instead, optical reading is used, which facilitates simple operation and is particularly secure with respect to undesired tampering or manipulation.

For this, information-carrying objects 30 are used, on which a code 31 is applied. The code 31 can for example comprise a one-dimensional or two-dimensional area with light and dark portions. The parameter data are contained in this code 31.

The light transmitter 10 can illuminate the information-carrying object 30 and the light receiver 40 records an image thereof, as also described above. The image recorded of the information-carrying object 30 is also referred to as a "code image". The control and evaluation unit analyses the code image and determines the parameter data contained therein. This operating mode is described as the data reading mode. Once the parameter data have been read, the data reading mode is terminated and there is a changeover to the measurement mode. In this mode, the read parameter data are used for measurement or analysis of an object to be examined.

Figure 2:
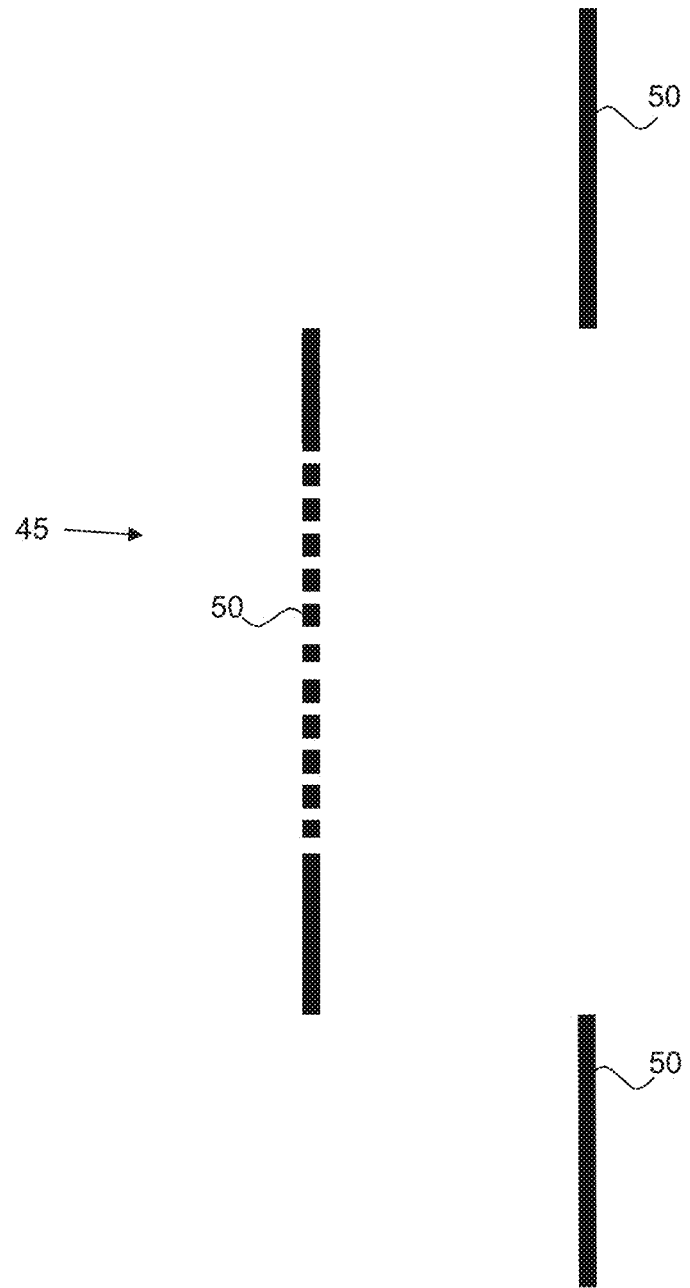
FIG. 2 shows an image that has been recorded with an embodiment of the measuring device according to the invention.

An example of a code image 45 recorded in the data reading mode is shown schematically in FIG. 2. In this case a light strip has been radiated onto the object 30 with the code 31 of FIG. 1. This light strip leads in the code image 45 to a strip 50. The strip 50 has two branches, which are based on a stepped, or staged, form of the object 30. In addition the strip 50 has an area consisting of alternately light and dark areas. These correspond to the code 31, which is formed here as a barcode. The alternating light and dark areas code the parameter data.

Figure 3:
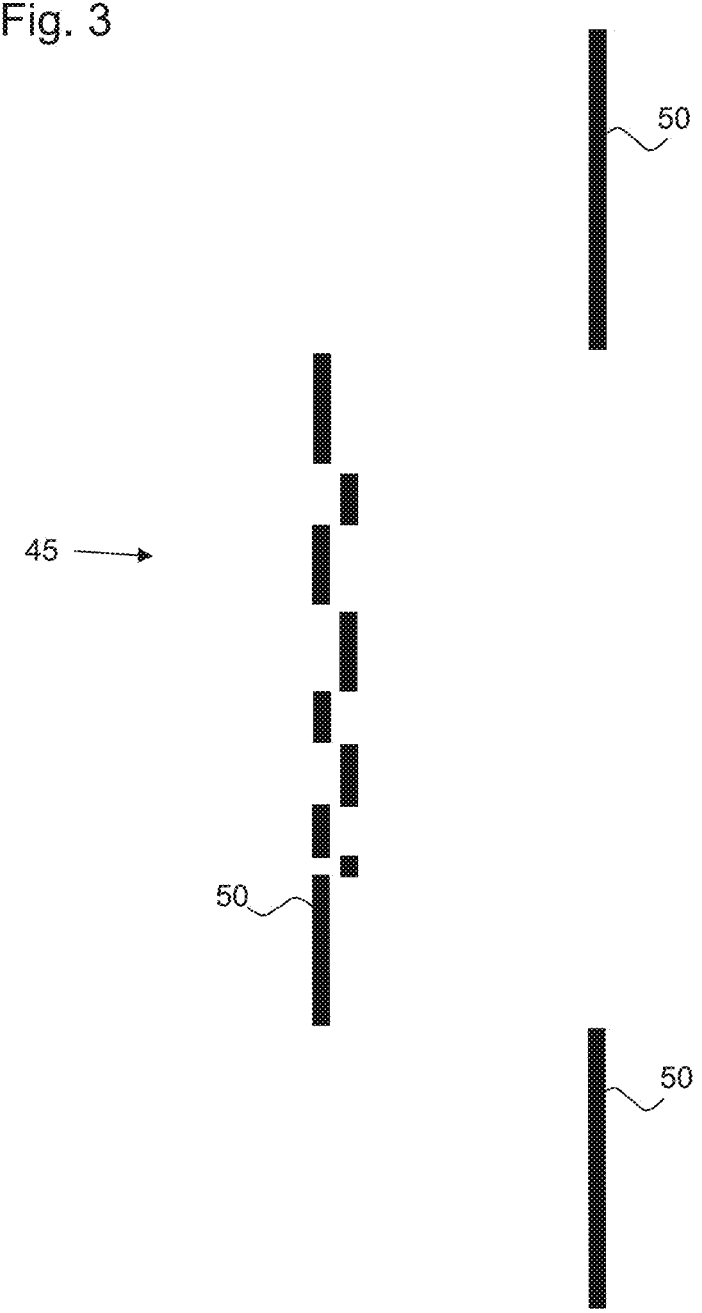
FIG. 3 shows a further image that has been recorded with an embodiment of a measuring device according to the invention.

Alternatively to a code area of alternating light and dark areas, an information-carrying object can also have a vertical profile, which encodes the parameter data. In this case, a form of the object is produced depending on the parameter data. This form or the vertical profile is now measured by means of the triangulation measurement with the light transmitter 10 and the light receiver 40. A code image 45 is recorded therewith, as shown by way of example in FIG. 3. In this case, the information-carrying object has been irradiated with a light strip, whereby a strip 50 can be detected in the recorded image 45. In the example shown, the strip 50 has in turn two larger branches, which can be determined by the start and the end of the object. In a middle area of the strip 50, the strip varies between two different heights. These two heights correspond to two different heights of a vertical profile of the object. Through this height variation, data, namely the parameter data, are encoded and read.

Instead of a vertical profile or a one-dimensional barcode, the parameter data can also be encoded in a two-dimensional code consisting of light and dark areas. In particular it can be useful in such a case not to transmit merely one light strip to the information-carrying object. Instead, a planar illumination may be desired here, through which it is ensured that the whole two-dimensional code area is illuminated. For this, there can be an additional illumination means 11 (see FIG. 1). This transmits additional illuminating light 12 in the direction of the object 30.

It can be provided that the additional illumination means 11 is switched on only in the data reading mode. The light transmitter 10 can be switched on in the data reading mode, as described above. Alternatively, however, the light transmitter 10 can also be switched off in data reading mode, whereby the additional illumination means 11 alone emits illuminating light. In other respects, the above explanations can apply to this embodiment, with the sole difference that the illuminating light is not emitted, or is not only emitted, by the light transmitter 10, but instead by the additional illumination means 11.

Through the measuring device according to the invention, parameter data can be simply and securely transmitted. For this, merely an information-carrying object is arranged in the measurement area of the measuring device. In this way, there is no need for staff members who have completed costly training to be on site. In addition, security is higher than in a radio transmission, which is relatively prone to error and subject to tampering or manipulation. The measuring device according to the invention also offers cost advantages, as, for example, an expensive radio module is not required.

What is claimed is:

1. A measuring device for triangulation measurement, comprising:
   a light transmitter for emitting illuminating light in a measurement mode,
   a transmitting optical system for directing the illuminating light in a light pattern in the direction of an object,
   a light receiver for recording an image, wherein, in the measurement mode, the image is a measurement image of the object, which is recorded by measuring light thrown back from the illuminated object areas,
   a control and evaluation unit, which is designed, in a measurement mode, to determine form and position information of the object based on the measurement image, and
   an additional illumination means for transmitting illuminating light, characterized in that the control and evaluation unit is designed to change over between the measurement mode and a data reading mode, wherein the control and evaluation unit is designed to evaluate the image, in the data reading mode, with respect to encoded parameter data and to use the parameter data read in this way in a subsequent measurement mode, the control and evaluation unit is designed to switch on the additional illumination means in the data reading mode, the control and evaluation unit is designed to switch off the additional illumination means in the measurement mode.

2. The measuring device according to claim 1, characterized in that the additional illumination means is designed so that it illuminates a larger area than the light transmitter.

3. The measuring device according to claim 1, characterized in that the parameter data include an exposure duration value and that the control and evaluation unit is designed to use the exposure duration value, in the measurement mode following the data reading mode, to control at least one of: the light transmitter or the light receiver.

4. The measuring device according to claim 1, characterized in that the parameter data include object target information and that the control and evaluation unit is designed to process by calculation form and position information of the object, determined based on the measurement image, with the object target information and to output a result hereof via an electrical connection of the measuring device.

5. The measuring device according to claim 1, characterized in that the control and evaluation unit is designed to carry out the data reading mode when the measuring device is switched on, and then to change over to the measurement mode.

6. The measuring device according to claim 1, characterized in that the control and evaluation unit is designed to evaluate the image recorded by the light receiver in order to establish whether a code and thus encoded parameter data are contained in the image, to carry out the data reading mode if a code is contained therein, and to carry out the measurement mode if no code is contained therein.

7. A combination of the measuring device according to claim 1, and an object containing the encoded parameter data.

8. The combination of the measuring device and the object according to claim 7, characterized in that the object has a code area, in which parameter data are encoded through light and dark areas, in particular through a one-dimensional barcode or a two-dimensional code.

9. The combination of the measuring device and the object according to claim 7, characterized in that the object has a vertical profile and parameter data are encoded through a progression of the vertical profile.

10. A method for triangulation measurement, comprising:

wherein, in a measurement mode:

with a light transmitter, illuminating light is emitted, with a transmitting optical system, the illuminating light is directed in a light pattern in the direction of an object, with a light receiver, light thrown back from illuminated object areas is measured and a measurement image of the object is recorded, and with a control and evaluation unit, form and position information of the object is determined based on the measurement image, characterized in that in a data reading mode:

with an additional illumination means, illuminating light is transmitted in the direction of an object provided with a code, the light receiver measures light from the object provided with the code and records a code image, the control and evaluation unit evaluates the code image with respect to encoded parameter data, that in a measurement mode following the data reading mode, the parameter data read in the data reading mode are used, the control and evaluation unit is designed to switch on the additional illumination means in the data reading mode, and the control and evaluation unit is designed to switch off the additional illumination means in the measurement mode.

11. The method according to claim 10, characterized in that in the data reading mode, a longer exposure time of the light receiver is set than in the measurement mode.

12. The method according to claim 10, characterized in that said light pattern has a plurality of light strips.

13. The measuring device according to claim 1, characterized in that said light pattern has a plurality of light strips.

14. The combination of the measuring device and the object according to claim 7, characterized in that the object has a code area, in which parameter data are encoded through at least one of: a one-dimensional barcode or a two-dimensional code.

\* \* \* \* \*